United States Patent
Li

(10) Patent No.: US 11,777,830 B2
(45) Date of Patent: Oct. 3, 2023

(54) VIRTUAL MACHINE STATUS PROBE METHOD, AND DEVICE

(71) Applicant: Huawei Cloud Computing Technologies Co., Ltd., Guizhou (CN)

(72) Inventor: Xiaowen Li, Shenzhen (CN)

(73) Assignee: HUAWEI CLOUD COMPUTING TECHNOLGIES CO., LTD., Guizhou (CN)

( * ) Notice: Subject to any disclaimer, the term of this patent is extended or adjusted under 35 U.S.C. 154(b) by 165 days.

(21) Appl. No.: 17/068,325

(22) Filed: Oct. 12, 2020

(65) Prior Publication Data
US 2021/0029012 A1    Jan. 28, 2021

Related U.S. Application Data

(63) Continuation of application No. PCT/CN2018/082852, filed on Apr. 12, 2018.

(51) Int. Cl.
*H04L 43/12* (2022.01)
*G06F 9/455* (2018.01)
*H04L 12/46* (2006.01)

(52) U.S. Cl.
CPC .......... *H04L 43/12* (2013.01); *G06F 9/45558* (2013.01); *H04L 12/4641* (2013.01);
(Continued)

(58) Field of Classification Search
CPC ..... H04L 43/12; H04L 12/4641; H04L 43/20; H04L 43/0817; H04L 45/50; H04L 45/70;
(Continued)

(56) References Cited

U.S. PATENT DOCUMENTS

2014/0269380 A1* 9/2014 Rusak .................. H04L 49/555
370/252
2015/0172121 A1    6/2015 Farkas et al.
(Continued)

FOREIGN PATENT DOCUMENTS

CN         101383688 A      3/2009
CN         102904776 A      1/2013
(Continued)

OTHER PUBLICATIONS

XP011613000, Cziva, R., et al., "SDN-Based Virtual Machine Management for Cloud Data Centers," IEEE Transactions on Network and Service Management, vol. 13, No. 2, Jun. 2016, 14 pages.
(Continued)

*Primary Examiner* — Dady Chery
(74) *Attorney, Agent, or Firm* — Conley Rose, P.C.

(57) ABSTRACT

A virtual machine status probe method includes obtaining an invocation message and an identifier of a first virtual machine, invoking a probe script based on the invocation message, and transferring the identifier of the first virtual machine to the probe script, sending a probe packet to a source device by running the probe script, receiving feedback information sent by the source device, where the feedback information is used to indicate the status of the first virtual machine, and determining, based on the feedback information, whether to recreate the first virtual machine in the destination device.

20 Claims, 8 Drawing Sheets

(52) U.S. Cl.
CPC ............ *G06F 2009/45562* (2013.01); *G06F 2009/45591* (2013.01); *G06F 2009/45595* (2013.01)

(58) Field of Classification Search
CPC . H04L 12/4633; H04L 43/0805; H04L 43/10; H04L 43/14; H04L 45/64; G06F 9/45558; G06F 2009/45562; G06F 2009/45591; G06F 2009/45595; G06F 11/0712; G06F 11/0757; G06F 11/0793; G06F 11/142; G06F 11/1484; G06F 2009/4557; G06F 9/455
See application file for complete search history.

(56) References Cited

U.S. PATENT DOCUMENTS

| | | | |
|---|---|---|---|
| 2017/0116084 A1* | 4/2017 | Liu | G06F 11/1662 |
| 2017/0168903 A1 | 6/2017 | Dornemann et al. | |
| 2017/0257266 A1 | 9/2017 | Cai et al. | |
| 2018/0241586 A1 | 8/2018 | Li et al. | |
| 2019/0199605 A1* | 6/2019 | Malboubi | H04L 63/0421 |

FOREIGN PATENT DOCUMENTS

| | | |
|---|---|---|
| CN | 103365700 A | 10/2013 |
| CN | 103618627 A | 3/2014 |
| CN | 105357038 A | 2/2016 |
| CN | 106452846 A | 2/2017 |
| CN | 106612211 A | 5/2017 |
| CN | 106980528 A | 7/2017 |
| CN | 107526653 A | 12/2017 |
| CN | 107733746 A | 2/2018 |
| WO | 2013171552 A1 | 11/2013 |

OTHER PUBLICATIONS

XP55769487, Klepac, M., et al.,"Enhancing Availability of Services Using Software-Defined Networking", Information and Communication Technologies and Services, vol. 13, No. 5, Dec. 2015, 7 pages.

XP055769311, Ashley, D., et al., "Version 1.1 Libvirt Application Development Guide Using Python," Aug. 22, 2016, 130 pages.

* cited by examiner

VIRTUAL MACHINE STATUS PROBE METHOD, AND DEVICE

CROSS-REFERENCE TO RELATED APPLICATIONS

This application is a continuation of International Patent Application No. PCT/CN2018/082852 filed on Apr. 12, 2018, the disclosure of which is hereby incorporated by reference in its entirety.

TECHNICAL FIELD

This application relates to the field of virtual machines, and more specifically, to a virtual machine status probe method, and a device.

BACKGROUND

In a high availability (HA) virtual machine system, when resources in the virtual machine system are permitted, an HA process is allowed to be triggered to remotely recreate a virtual machine when the virtual machine in a source device is faulty, to further restore a corresponding service. However, in the virtual machine HA process, that the virtual machine in the source device is faulty should be ensured. Otherwise, if the virtual machine is incorrectly considered faulty but actually the virtual machine runs normally, after the virtual machine is recreated remotely, two virtual machines that use a same Internet Protocol (IP) address and operate on a same volume exist in the system. To be specific, the virtual machines are called split-brain virtual machines. Because the split-brain virtual machines simultaneously operate on a same storage resource, unexpected abnormality may occur. In other approaches, two manners are usually used to determine whether a virtual machine in a source device is faulty, probe whether a network from a management node to a server in which the virtual machine is located is normal, or use a shared storage for a virtual machine in a cluster, and probe, in a storage plane, whether the virtual machine is faulty. However, incorrect determining or a failure may occur in both the manners.

Therefore, how to improve reliability of probing whether a virtual machine in the source device is faulty is an urgent problem to be resolved.

SUMMARY

This application provides a virtual machine status probe method and a device, to improve reliability of probing whether a virtual machine in the source device is faulty, thereby effectively avoiding occurrence of a virtual machine split brain.

According to a first aspect, a virtual machine status probe method is provided. The method is used to when a HA procedure of a first virtual machine is triggered, determine whether to recreate the first virtual machine in a destination device, and the method is performed by the destination device, and includes obtaining an invocation message, where the invocation message is used to probe the first virtual machine, and obtaining an identifier of the first virtual machine, and invoking a probe script based on the invocation message, and transferring the identifier of the first virtual machine to the probe script, sending a probe packet by running the probe script, where the probe packet is used to probe a status of the first virtual machine in the source device, and the probe packet includes the identifier of the first virtual machine, receiving feedback information sent by the source device, where the feedback information is used to indicate the status of the first virtual machine, and determining, based on the feedback information, whether to recreate the first virtual machine in the destination device.

Therefore, if a virtual machine HA procedure is triggered, the destination device in which the first virtual machine needs to be recreated sends a probe packet to the source device in which the first virtual machine is located, where the probe packet is used to probe whether the first virtual machine runs in the source device. The destination device determines, based on the feedback information sent by the source device, whether to configure the first virtual machine in the destination device. This improves reliability of probing whether the virtual machine in the source device is faulty, and effectively avoids occurrence of a virtual machine split brain.

With reference to the first aspect, in some implementations of the first aspect, when a probe port of the source device and a probe port of the destination device are located in a same virtual local area network (VLAN), the probe packet is a broadcast packet, and the probe packet includes a probe VLAN identifier of a service plane in which the first virtual machine is located.

With reference to the first aspect, in some implementations of the first aspect, the method further includes receiving the probe VLAN identifier that is of the first service plane in which the first virtual machine is located and that is sent by a management device, configuring the probe port in the first service plane, and configuring the probe VLAN identifier for the probe port, and the sending a probe packet by running the probe script includes sending the probe packet through the probe port.

With reference to the first aspect, in some implementations of the first aspect, when the source device communicates with the destination device through an overlay network, the probe packet is a unicast packet, and the probe packet includes an identifier of a tunnel port of the source device.

With reference to the first aspect, in some implementations of the first aspect, the method further includes obtaining, from the management device based on the identifier of the first virtual machine, the identifier of the tunnel port corresponding to the source device, and the sending a probe packet by running the probe script includes sending the probe packet through a tunnel port of the destination device.

With reference to the first aspect, in some implementations of the first aspect, before the obtaining an invocation message, the method further includes sending a first message to a server, where the first message is used to request disk storage information of the first virtual machine in the server, and is used to determine a status of the first virtual machine by probing a storage plane of the first virtual machine, and receiving no feedback information from the server within a predetermined time period.

In this case, when a HA procedure of the virtual machine is triggered, if the system in which the virtual machine is located supports storage plane probe, the storage plane probe may be performed first. If the storage plane probe fails, the destination device in which the first virtual machine needs to be recreated may further send a probe packet to the source device in which the first virtual machine is located, to probe whether the first virtual machine runs normally in the source device. Therefore, if incorrect determining or a failure occurs when whether the virtual machine is faulty is probed in the storage plane, the destination device further sends the probe packet to the source device in which the first virtual machine is located, to probe whether the first virtual machine runs normally in the source device. This improves reliability of probing whether the virtual machine in the source device is faulty, and effectively avoids occurrence of a virtual machine split brain.

With reference to the first aspect, in some implementations of the first aspect, the determining, based on the feedback information, whether to recreate the first virtual machine in the destination device includes determining, when the feedback information indicates that the status of the first virtual machine in the source device is normal, not to recreate the first virtual machine in the destination device, or determining, when the feedback information indicates that the status of the first virtual machine in the source device is faulty, to recreate the first virtual machine in the destination device.

According to a second aspect, a virtual machine status probe method is provided. The method is used to when a HA procedure of a first virtual machine is triggered, determine whether to recreate the first virtual machine in the destination device, and the method is performed by a source device, and includes receiving a probe packet sent by the destination device, where the probe packet is used to probe a status of the first virtual machine in the source device, and the probe packet includes an identifier of the first virtual machine, querying for the status of the first virtual machine based on the probe packet, and sending feedback information to the destination device, where the feedback information is used to indicate the status of the first virtual machine in the source device.

With reference to the second aspect, in some implementations of the second aspect, when a probe port of the source device and a probe port of the destination device are located in a same VLAN, the probe packet is a broadcast packet, and the probe packet includes a probe VLAN identifier of a service plane in which the first virtual machine is located.

With reference to the second aspect, in some implementations of the second aspect, the method further includes receiving the probe VLAN identifier that is of the first service plane in which the first virtual machine is located and that is sent by a management device, configuring the probe port in the first service plane, and configuring the probe VLAN identifier for the probe port, and the receiving a probe packet sent by the destination device includes receiving, through the probe port, the probe packet sent by the destination device.

With reference to the second aspect, in some implementations of the second aspect, when the source device communicates with the destination device through an overlay network, the probe packet is a unicast packet, and the probe packet includes an identifier of a tunnel port of the source device.

With reference to the second aspect, in some implementations of the second aspect, the receiving a probe packet sent by the destination device includes receiving, through the probe port, the probe packet sent by the destination device.

According to a third aspect, a system is provided. The system includes a destination device and a source device, and includes the destination device obtains invocation message when a HA procedure of a first virtual machine is triggered, where the invocation message is used to probe the first virtual machine, the destination device obtains an identifier of the first virtual machine, the destination device invokes a probe script based on the invocation message, and transfers the identifier of the first virtual machine to the probe script, the destination device sends a probe packet by running the probe script, where the probe packet is used to probe a status of the first virtual machine in the source device, and the probe packet includes the identifier of the first virtual machine, the source device receives the probe packet sent by the destination device, the source device queries for the status of the first virtual machine based on the probe packet, the source device sends feedback information to the destination device, where the feedback information is used to indicate the status of the first virtual machine in the source device, the destination device receives the feedback information sent by the source device, and the destination device determines, based on the feedback information, whether to recreate the first virtual machine in the destination device.

Therefore, if a virtual machine HA procedure is triggered, the destination device in which the first virtual machine needs to be recreated sends a probe packet to the source device in which the first virtual machine is located, where the probe packet is used to probe whether the first virtual machine runs in the source device. The destination device determines, based on the feedback information sent by the source device, whether to configure the first virtual machine in the destination device. This improves reliability of probing whether the virtual machine in the source device is faulty, and effectively avoids occurrence of a virtual machine split brain.

With reference to the third aspect, in some implementations of the third aspect, when a probe port of the source device and a probe port of the destination device are located in a same VLAN, the probe packet is a broadcast packet, and the probe packet includes a probe VLAN identifier of a first service plane in which the first virtual machine is located.

With reference to the third aspect, in some implementations of the third aspect, the system further includes a management device. The management device receives the probe VLAN identifier of the first service plane, and sends the probe VLAN identifier to the source device and the destination device.

With reference to the third aspect, in some implementations of the third aspect, the destination device receives the probe VLAN identifier, the destination device configures the probe port in the first service plane, and configures the probe VLAN identifier for the probe port, and that the destination device sends a probe packet by running the probe script includes the destination device sends the probe packet through the probe port.

With reference to the third aspect, in some implementations of the third aspect, the source device receives the probe VLAN identifier sent by the management device, the source device configures the probe port in the first service plane, and configures the probe VLAN identifier for the probe port, and that the source device receives the probe packet sent by the destination device includes the source device receives, through the probe port, the probe packet sent by the destination device.

With reference to the third aspect, in some implementations of the third aspect, the system further includes a switch, the controller sends the probe VLAN identifier that is of the first service plane in which the first virtual machine is located to the switch, the switch receives the probe VLAN identifier that is of the first service plane in which the first virtual machine is located and that is sent by the controller, the switch associates the VLAN identifier with an overlay network identifier, and the switch converts, based on the associated VLAN identifier and overlay network identifier, a packet that is received by the switch and that includes the VLAN identifier into a packet in an overlay form for sending.

With reference to the third aspect, in some implementations of the third aspect, when the source device communicates with the destination device through an overlay network, the probe packet is a unicast packet, and the probe packet includes an identifier of a tunnel port of the source device.

With reference to the third aspect, in some implementations of the third aspect, the system further includes a management device, the destination device obtains, from the management device based on the identifier of the first virtual machine, the identifier of the tunnel port corresponding to the source device, and that the destination device sends a probe packet by running the probe script includes the destination device sends the probe packet through a tunnel port of the destination device.

With reference to the third aspect, in some implementations of the third aspect, that the source device receives the probe packet sent by the destination device includes the source device receives the probe packet through the tunnel port of the source device.

With reference to the third aspect, in some implementations of the third aspect, before that the destination device invokes the invocation message, the method further includes the destination device sends a first message to a server, where the first message is used to request disk storage information of the first virtual machine in the server, and is used to determine a status of the first virtual machine by probing a storage plane of the first virtual machine, and the destination device receives no feedback information from the server within a predetermined time period.

With reference to the third aspect, in some implementations of the third aspect, that the destination device determines, based on the feedback information, whether to recreate the first virtual machine in the destination device includes the destination device determines, when the feedback information indicates that the status of the first virtual machine in the source device is normal, not to recreate the first virtual machine in the destination device, or the destination device determines, when the feedback information indicates that the status of the first virtual machine in the source device is faulty, to recreate the first virtual machine in the destination device.

According to a fourth aspect, a virtual machine fault probe method is provided. The method is used to when a HA procedure of a first virtual machine is triggered, determine whether to recreate the first virtual machine in a destination device, and the method is performed by a switch, and includes receiving a probe VLAN identifier that is of a first service plane in which the first virtual machine is located and that is sent by a controller, associating the VLAN identifier with an overlay network identifier, and converting, based on the associated VLAN identifier and overlay network identifier, a packet that is received by the switch and that includes the VLAN identifier into a packet in an overlay form for sending.

According to a fifth aspect, a destination device is provided. The destination device includes an obtaining module configured to obtain an invocation message, where the invocation message is used to probe the first virtual machine, where the obtaining module is further configured to obtain an identifier of the first virtual machine, an invocation module configured to invoke a probe script based on the invocation message, and transfer the identifier of the first virtual machine to the probe script, a sending module configured to send a probe packet by running the probe script, where the probe packet is used to probe a status of the first virtual machine in the source device, and the probe packet includes the identifier of the first virtual machine, a receiving module configured to receive feedback information sent by the source device, where the feedback information is used to indicate the status of the first virtual machine, and a determining module configured to determine, based on the feedback information, whether to recreate the first virtual machine in the destination device.

With reference to the fifth aspect, in some implementations of the fifth aspect, when a probe port of the source device and a probe port of the destination device are located in a same VLAN, the probe packet is a broadcast packet, and the probe packet includes a probe VLAN identifier of a service plane in which the first virtual machine is located.

With reference to the fifth aspect, in some implementations of the fifth aspect, the receiving module is further configured to receive the probe VLAN identifier that is of the first service plane in which the first virtual machine is located and that is sent by a management device, and the destination device further includes a configuration module configured to configure the probe port in the first service plane, and configure the probe VLAN identifier for the probe port, and the sending module is further configured to send the probe packet through the probe port.

With reference to the fifth aspect, in some implementations of the fifth aspect, when the source device communicates with the destination device through an overlay network, the probe packet is a unicast packet, and the probe packet includes an identifier of a tunnel port of the source device.

With reference to the fifth aspect, in some implementations of the fifth aspect, the obtaining module is further configured to obtain, from the management device based on the identifier of the first virtual machine, the identifier of the tunnel port corresponding to the source device, and the sending module is further configured to send the probe packet through a tunnel port of the destination device.

With reference to the fifth aspect, in some implementations of the fifth aspect, the sending module is further configured to send a first message to a server, where the first message is used to request disk storage information of the first virtual machine in the server, and is used to determine a status of the first virtual machine by probing a storage plane of the first virtual machine, and the receiving module is further configured to receive no feedback information from the server within a predetermined time period.

With reference to the fifth aspect, in some implementations of the fifth aspect, the determining module is further configured to determine, when the feedback information indicates that the status of the first virtual machine in the source device is normal, not to recreate the first virtual machine in the destination device, or determine, when the feedback information indicates that the status of the first virtual machine in the source device is faulty, to recreate the first virtual machine in the destination device.

According to a six aspect, a source device is provided. The source device includes a receiving module configured to receive a probe packet sent by a destination device, where the probe packet is used to probe a status of the first virtual machine in the source device, and the probe packet includes an identifier of the first virtual machine, a query module configured to query for the status of the first virtual machine based on the probe packet, and a sending module configured to send feedback information to the destination device, where the feedback information is used to indicate the status of the first virtual machine in the source device.

With reference to the six aspect, in some implementations of the six aspect, when a probe port of the source device and a probe port of the destination device are located in a same VLAN, the probe packet is a broadcast packet, and the probe packet includes a probe VLAN identifier of a service plane in which the first virtual machine is located.

With reference to the six aspect, in some implementations of the six aspect, the receiving module is further configured to receive the probe VLAN identifier that is of the first service plane in which the first virtual machine is located and that is sent by a management device, and the source device further includes a configuration module configured to configure the probe port in the first service plane, and configure the probe VLAN identifier for the probe port, and the receiving module is further configured to receive, through the probe port, the probe packet sent by the destination device.

With reference to the six aspects, in some implementations of the six aspects, when the source device communicates with the destination device through an overlay network, the probe packet is a unicast packet, and the probe packet includes an identifier of a tunnel port of the source device.

With reference to the six aspects, in some implementations of the six aspects, the receiving module is further configured to receive, through the tunnel port of the source device, the probe packet.

According to a seventh aspect, a destination device is provided. The destination device includes at least one processor, a memory, and an interface, where the interface is used for communication with a source device, the memory is configured to store computer program code, the computer program code includes an instruction, and the stored instruction is directly or indirectly executed by the at least one processor such that the destination device can perform the method in any one of the first aspect or the optional implementations of the first aspect.

According to an eighth aspect, a source device is provided. The source device includes at least one processor, a memory, and an interface, where the interface is used for communication with a destination device, the memory is configured to store computer program code, the computer program code includes an instruction, and when the at least one processor executes the instruction, the source device performs the method in any one of the second aspect or the optional implementations of the second aspect.

According to a ninth aspect, a chip system is provided. The chip system includes at least one processor. The at least one processor is configured to execute a stored instruction such that a destination device can perform the method in any one of the first aspect or the optional implementations of the first aspect.

According to a tenth aspect, a chip system is provided. The chip system includes at least one processor. The at least one processor is configured to execute a stored instruction such that a source device can perform the method in any one of the second aspect or the optional implementations of the second aspect.

According to an eleventh aspect, a computer program product is provided. The computer program product includes an instruction, and when the instruction is executed, a destination device can be enabled to perform the method in any one of the first aspect or the optional implementations of the first aspect.

According to a twelfth aspect, a computer program product is provided. The computer program product includes an instruction, and when the instruction is executed, a source device can be enabled to perform the method in any one of the second aspect or the optional implementations of the second aspect.

According to a thirteenth aspect, a computer storage medium is provided. The computer storage medium stores a program instruction, and when the instruction is executed, the destination device can perform the method in any one of the first aspect or the optional implementations of the first aspect.

According to a fourteenth aspect, a computer storage medium is provided. The computer storage medium stores a program instruction, and when the instruction is executed, the source device can perform the method in any one of the second aspect or the optional implementations of the second aspect.

DESCRIPTION OF EMBODIMENTS

The following describes technical solutions of this application with reference to the accompanying drawings.

The technical solutions of the embodiments of this application may be applied to various communications systems, such as a Global System for Mobile Communications (GSM) system, a code division multiple access (CDMA) system, a wideband code-division multiple access (WCDMA) system, a General Packet Radio Service (GPRS) system, a Long-Term Evolution (LTE) system, an LTE frequency-division duplex (FDD) system, an LTE time-division duplex (TDD) system, a universal mobile telecommunications system (UMTS), a worldwide interoperability for microwave access (WiMAX) communications system, a 5th generation (5G) system, and a new radio (NR) system.

A destination device and a source device in the embodiments of this application may be referred to as user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may further be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

Figure 1:
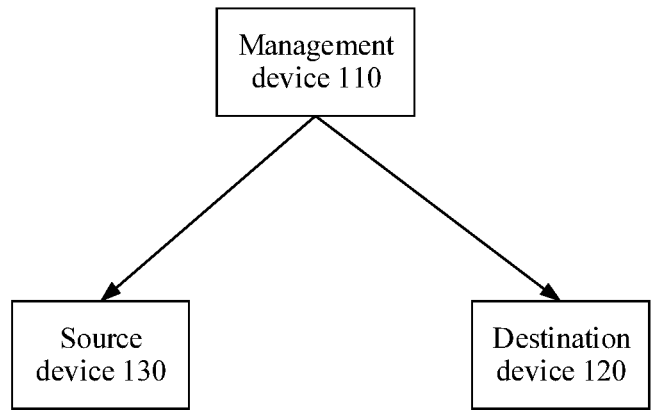
FIG. 1 is a schematic block diagram of an architecture of a system for a virtual machine status probe method and a device according to this application.

FIG. 1 is a schematic block diagram of an architecture of a system 100 for a virtual machine status probe method and a device according to this application. As shown in FIG. 1, the architecture of the system 100 includes a management device 110, a destination device 120, and a source device 130. Different virtual machines may be created in the destination device 120 and the source device 130. The management device 110 is configured to manage the destination device 120 and the source device 130, for example, send, to the destination device 120 and the source device 130, some configuration information used to create and configure a virtual machine, and the like.

It should be noted that, FIG. 1 is merely a diagram of an example architecture. In addition to function units shown in FIG. 1, a plurality of other physical devices may further be included in the architecture of the system. This is not limited in this embodiment of this application.

A virtual machine status probe method provided in this application may be applied to a destination device and a source device. The destination device and the source device each include a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more types of computer operating systems that process a service using a process, for example, a LINUX operating system, a UNIX operating system, an ANDROID operating system, an IOS operating system, or a windows operating system. The application layer includes applications such as a browser, a contact list, text processing software, and instant communication software.

In addition, aspects or features of this application may be implemented as a method, an apparatus, or a product that uses standard programming and/or an engineering technology. The term "product" used in this application covers a computer program that can be accessed from any computer-readable component, carrier or medium. For example, the computer-readable medium may include but is not limited to a magnetic storage component (for example, a hard disk, a floppy disk, or a magnetic tape), an optical disc (for example, a compact disc (CD), a digital versatile disc (DVD), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to various media that can store, contain, and/or carry an instruction and/or data.

Figure 2:
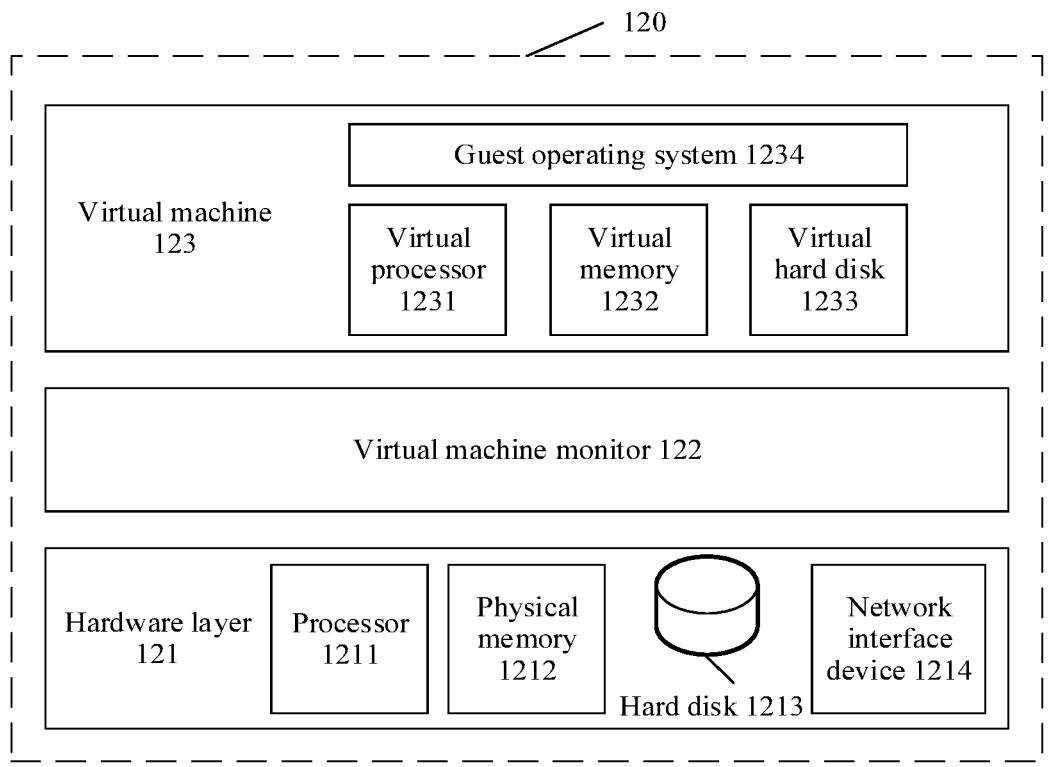
FIG. 2 is a schematic block diagram of a physical host according to this application.

FIG. 2 is a schematic block diagram of a physical host according to this application. An example in which the physical host is the destination device 120 is used for description. The physical host 120 includes a hardware layer 121, a virtual machine monitor (VMM) 122 running on the hardware layer 121, and one or more virtual machines 123 running on the VMM 122. The hardware layer 121 may include a processor 1211, a physical memory 1212, a hard disk 1213, and a network interface device 1214. There may be one or more processors 1211. The network interface device 1214 may be a network adapter or a network interface card configured to connect to any connectable network such as the internet or an enterprise network. The virtual machine 123 may include a virtual processor 1231, a virtual memory 1232, a virtual hard disk 1233, and a guest operating system (Guest OS) 1234, where the Guest OS 1234 is an operating system running on virtual devices such as the virtual processor 1231, the virtual memory 1232, and the virtual hard disk 1233.

It should be understood that the physical host shown in FIG. 2 is merely an example, and should not constitute a special limitation on the embodiments of this application. The physical host shown in FIG. 2 may be the destination device or the source device in this application. The destination device may also be referred to as a destination device, and the source device may also be referred to as a source device.

Figure 3:
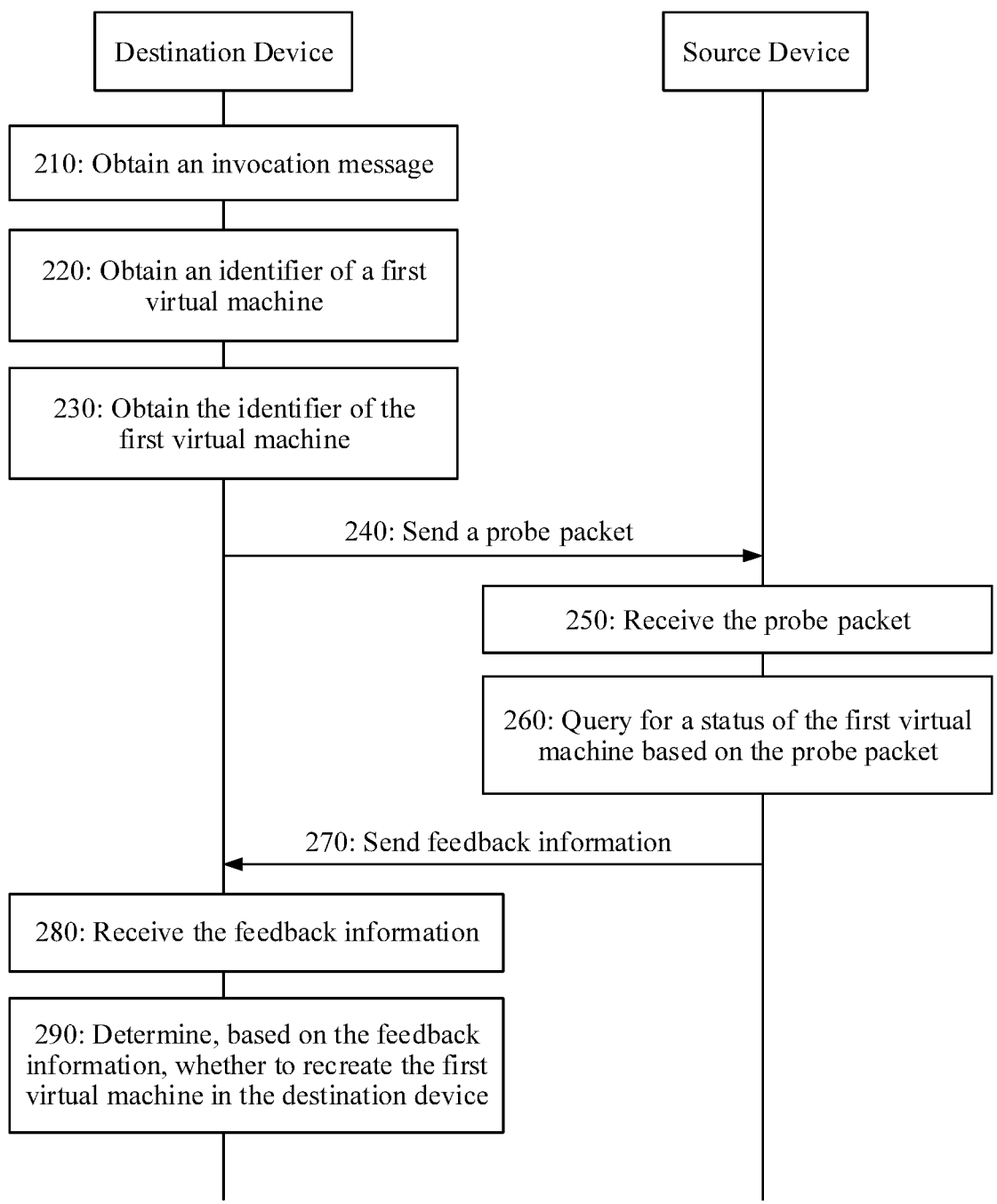
FIG. 3 is a schematic flowchart of a virtual machine status probe method according to this application.

The following describes in detail a virtual machine status probe method provided in this application with reference to FIG. 3. FIG. 3 is a schematic flowchart of a virtual machine status probe method 200 according to an embodiment of this application. The method 200 may be applied to the system shown in FIG. 1, or certainly may be applied to another system. This is not limited in this embodiment of this application.

As shown in FIG. 3, the method 200 includes the following content.

In 210, when a HA procedure of a first virtual machine is triggered, the destination device obtains invocation message, where the invocation message is used to probe the first virtual machine.

In 220, the destination device obtains an identifier of the first virtual machine.

In 230, the destination device invokes a probe script based on the invocation message, and transfers the identifier of the first virtual machine to the probe script.

In 240, the destination device sends a probe packet by running the probe script, where the probe packet is used to probe a status of the first virtual machine in the source device, and the probe packet includes the identifier of the first virtual machine.

In 250, the source device receives the probe packet sent by the destination device.

In 260, the source device queries for the status of the first virtual machine based on the probe packet.

In 270, the source device sends feedback information to the destination device, where the feedback information is used to indicate the status of the first virtual machine in the source device.

In 280, the destination device receives the feedback information sent by the source device.

In 290, the destination device determines, based on the feedback information, whether to recreate the first virtual machine in the destination device.

Therefore, in this embodiment of this application, if in an HA system, a virtual machine creation procedure is triggered in a destination device, the destination device in which a first virtual machine needs to be recreated sends a probe packet to a source device in which the first virtual machine is located, where the probe packet is used to probe whether the first virtual machine runs in the source device. The destination device determines, based on the feedback information sent by the source device, whether to configure the first virtual machine in the destination device. This improves reliability of probing whether the virtual machine in the source device is faulty, and effectively avoids occurrence of a virtual machine split brain.

It should be understood that the probing a virtual machine status means probing a running status of the virtual machine in the source device, that is, whether the virtual machine is faulty and cannot run normally in the source device.

Optionally, when a probe port of the source device and a probe port of the destination device are located in a same VLAN, the probe packet is a broadcast packet, and the probe packet includes a probe VLAN identifier of a first service plane in which the first virtual machine is located.

Optionally, the destination device receives the probe VLAN identifier. The destination device configures the probe port in the first service plane, and configures the probe VLAN identifier for the probe port. That the destination device sends a probe packet by running the probe script includes the destination device sends the probe packet through the probe port.

Optionally, the source device receives the probe VLAN identifier sent by a management device. The source device configures the probe port in the first service plane, and configures the probe VLAN identifier for the probe port. That the source device receives the probe packet sent by the destination device includes the source device receives, through the probe port, the probe packet sent by the destination device.

Optionally, when the source device communicates with the destination device through an overlay network, the probe packet is a unicast packet, and the probe packet includes an identifier of a tunnel port of the source device.

Optionally, the system further includes a management device. The destination device obtains, from the management device based on the identifier of the first virtual machine, the identifier of the tunnel port corresponding to the source device. That the destination device sends a probe packet by running the probe script includes the destination device sends the probe packet through a tunnel port of the destination device.

Optionally, that the source device receives the probe packet sent by the destination device includes the source device receives the probe packet through the tunnel port of the source device.

Optionally, before that the destination device sends an invocation message, the method further includes the destination device sends a first message to a server, where the first message is used to request disk storage information of the first virtual machine in the server, and is used to determine a status of the first virtual machine by probing a storage plane of the first virtual machine, and the destination device receives no feedback information from the server within a predetermined time period.

In this case, when a HA procedure of the virtual machine is triggered, if the system in which the virtual machine is located supports storage plane probe, the storage plane probe may be performed first. If the storage plane probe fails, the destination device in which the first virtual machine needs to be recreated may further send a probe packet to the source device in which the first virtual machine is located, to probe whether the first virtual machine runs normally in the source device. Therefore, if incorrect determining or a failure occurs when whether the virtual machine is faulty is probed in the storage plane, the destination device further sends the probe packet to the source device in which the first virtual machine is located, to probe whether the first virtual machine runs normally in the source device. This improves reliability of probing whether the virtual machine in the source device is faulty, and effectively avoids occurrence of a virtual machine split brain.

Optionally, that the destination device determines, based on the feedback information, whether to recreate the first virtual machine in the destination device includes when the feedback information indicates that the status of the first virtual machine in the source device is normal, the destination device determines not to recreate the first virtual machine in the destination device, or when the feedback information indicates that the status of the first virtual machine in the source device is faulty, the destination device determines to recreate the first virtual machine in the destination device.

For clearer understanding of this application, the following describes the method 200 in detail in different application scenarios, for example, a VLAN scenario, an overlay scenario, and a scenario of interconnection with a third-party software-defined network (SDN) controller.

Figure 4:
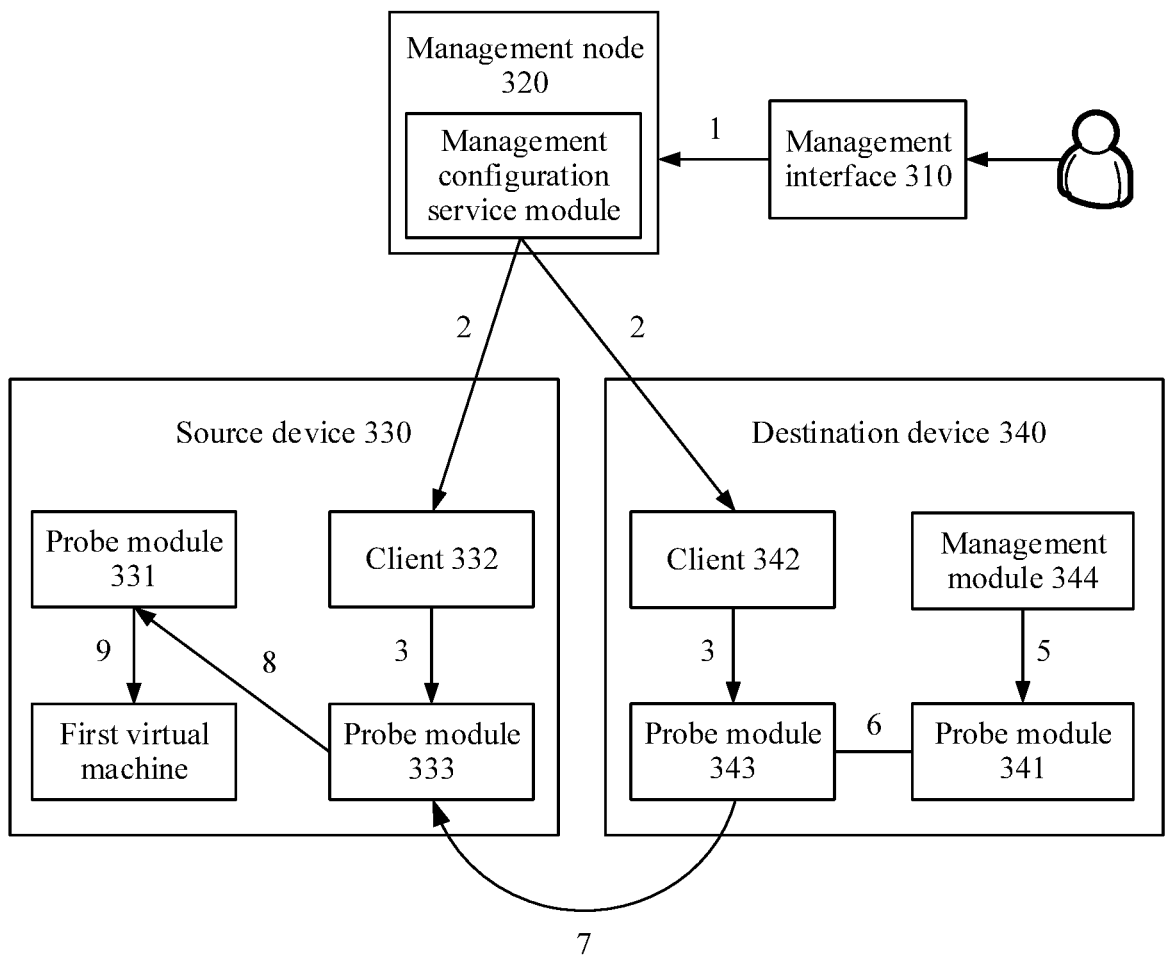
FIG. 4 is a schematic block diagram of an application scenario of a virtual machine status probe method according to this application.

FIG. 4 is a schematic block diagram of an application scenario 300 of a virtual machine status probe method according to this application. The application scenario 300 is a VLAN. A VLAN is a logical network segment divided from a local area network. A VLAN field (VID) is used to identify a VLAN. A length of the VID is 12 bits and a value range is from 0 to 4095. 0 and 4095 are reserved values and cannot be used by a user. Therefore, one Ethernet can be divided into a maximum of 4094 VLANs. The application scenario 300 includes a management interface 310, a management node 320, a source device 330, and a destination device 340.

The management interface 310 is an interface-based installation and deployment tool, and an administrator uses the management interface 310 to configure a physical plane of a virtual machine and a probe identifier (where the probe identifier may also be referred to as a probe VLAN) of the physical plane.

The management node 320 includes a management configuration service module. The module is mainly configured to receive configuration information that is delivered by the administrator using the management interface 310, and trigger, based on the configuration information, a client in a corresponding host to implement configuration or modify a corresponding configuration. The management node 320 is responsible for monitoring a running status of a virtual machine in each host, and when the management node 320 finds that a virtual machine in a host is faulty, an HA procedure may be triggered to re-configure the virtual machine in another host.

A first virtual machine (Virtual Machine 1) is configured in the source device 330, and the source device further includes a probe module 331, a client 332, and a probe port 333. The probe module 331 may provide a capability of sending a user-defined broadcast probe packet, and receive a probe packet to probe whether a virtual machine is alive. The client 332 is configured to receive the configuration information sent by the management node 320, and perform a related operation to complete a configuration change. The probe port 333 is a probe port of a corresponding physical plane, and the probe module 331 sends and receives a packet through the probe port 333.

The destination device 340 includes a probe module 341, a client 342, a probe port 343, and a management module 344. For the probe module 341, the client 342, and the probe port 343, refer to corresponding descriptions of those in the source device 330. Details are not described herein again. The management module 344 is responsible for computing virtualization management, and is configured to create and manage a virtual machine deployed in the destination device.

It should be understood that the application scenario shown in FIG. 4 is merely for clearer understanding of this application, and should not constitute a special limitation on this embodiment of this application. For example, in addition to the source device 330 and the destination device 340, another host may further be managed by the management node, and the application scenario 300 may further include another management node. Other virtual machines may be further configured in the source device 330 and the destination device 340. Modular units configured in the source device 330 and the destination device 340 should be consistent. The source device 330 may alternatively be a destination device, and the destination device 340 may alternatively be a source device. For example, if a Virtual Machine 2 is configured in the destination device 340, and if the Virtual Machine 2 needs to be configured in the source device 330 in an HA application scenario, the destination device 340 may be referred to as a source device, and the source device 330 may be referred to as a destination device.

For clearer understanding of this application, the following describes a specific procedure of this application in detail.

1. The administrator configures a probe identifier of a service plane physnet 2 using the management interface 310 (where herein, it is assumed that a physical plane corresponding to the Virtual Machine 1 is physnet 2, when creating a virtual machine, the user needs to specify a network VLAN used by the virtual machine to perform service communication, the network is mapped to a corresponding physical plane, a mapping relationship between the network and the physical plane is stored on the management node 320, and the virtual machine finally performs communication using the physical plane, and the physical plane is also referred to as a service plane.) and sends the probe identifier of the service plane physnet 2 to the management node 320.

2. The management node 320 receives the probe identifier of the service plane physnet 2 and sends the probe identifier of the service plane physnet 2 to each host managed by the management node, for example, the source device 330 and the destination device 340 shown in FIG. 4.

3. A client of each host creates a probe port corresponding to the probe identifier in the service plane physnet 2 and the probe port may use the probe identifier as a mark. The probe port 333 of the source device shown in FIG. 3 is a probe port of the service plane physnet 2, a mark of the probe port 333 is the probe identifier of the service plane physnet 2, the probe port 343 of the destination device is a probe port of the service plane physnet 2, and a mark of the probe port 343 is the probe identifier of the service plane physnet 2.

Optionally, each host may alternatively create, in the service plane physnet 2 using a custom script or in another manner, a probe port corresponding to the probe identifier. A specific method for creating a probe port in the service plane by the host is not limited in this application.

4. A probe module on a virtual machine in a cluster monitors the probe port of the service plane physnet 2. This step is not shown in FIG. 3.

5. When a management configuration service module in the management node 320 detects that the Virtual Machine 1 in the source device 330 is faulty, an HA procedure is triggered, and when the management configuration service module determines to configure the Virtual Machine 1 in the destination device 340, the management module 344 in the destination device 340 sends an invocation message to the probe module 341, where the invocation message is used to trigger the probe module 341 to execute a probe script, and the invocation message includes an identifier of the Virtual Machine 1 and an identifier of a service plane in which the Virtual Machine 1 is located.

The identifier of the service plane in which the Virtual Machine 1 is located is determined by obtaining, by the management module 344, a network used by the Virtual Machine to perform communication and based on a mapping relationship between the network and a physical plane.

Optionally, the invocation message may be an application programming interface (API), and the API triggers the probe module 341 to execute the probe script.

Optionally, before the management module 344 in the destination device 340 sends the invocation message to the probe module 341, the destination device 340 triggers storage plane probe for the Virtual Machine 1, but receives no feedback information from a storage server 350 within a specified time. Further, the management module 344 sends the invocation message to the probe module 341, and probes the virtual machine in the service plane.

Figure 5:
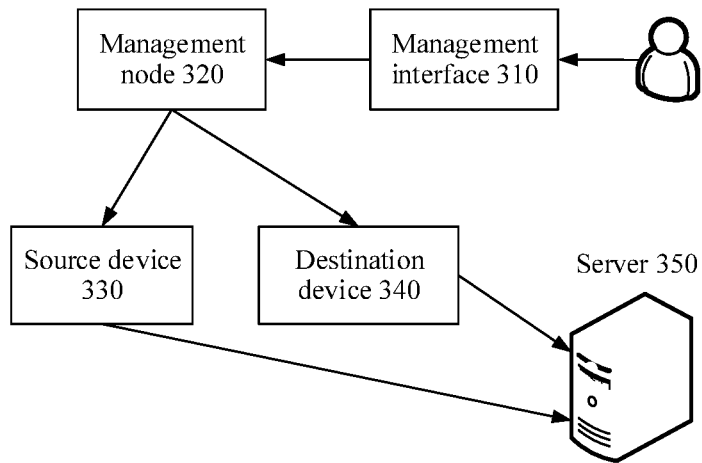
FIG. 5 is a schematic block diagram of an application scenario of a virtual machine status probe method according to this application.

The following describes, with reference to FIG. 5, how the destination device 340 performs storage plane probe. As shown in FIG. 5, the application scenario 300 may further include a server 350. The server 350 is a shared storage unit in the application scenario 300. Each virtual machine in the application scenario 300 uses shared storage. A storage space in the server 350 is allocated to each virtual machine, and when the virtual machine runs normally, the storage space corresponding to the virtual machine is locked. The storage space corresponding to the virtual machine is not locked only when the virtual machine is abnormal. For example, at a moment ti, the Virtual Machine 1 is created in the source device 330, the Virtual Machine 1 obtains a storage space 1 in the server 350, and the storage space 1 is locked at the moment $t_1$. If the HA application scenario is caused by a non-virtual machine fault, when the destination device 340 determines to configure the Virtual Machine 1, the destination device 340 obtains the storage space 1 from the server 350 when creating the Virtual Machine 1, but the storage space 1 is locked. Therefore, the destination device 340 no longer creates the Virtual Machine 1. This can avoid occurrence of a virtual machine split brain.

However, the storage plane probe depends on the shared storage. If the virtual machine uses local storage, the storage plane probe cannot be performed. In addition, if the server that provides the shared storage is faulty, or a software application scenario of the shared storage is faulty, probe on the storage plane may be affected. Therefore, when the storage plane probe is abnormal, or the application scenario in which the virtual machine is located does not support the storage plane probe, a virtual machine running status may be probed using a service plane in which the virtual machine is located, in other words, as described above, in the HA application scenario, when the destination device 340 determines to configure the Virtual Machine 1, the management module 344 in the destination device 340 sends an invocation message to the probe module 341, where the invocation message is used to trigger the probe module 341 to execute a probe script, and the invocation message includes the identifier of the Virtual Machine 1 and the identifier of the service plane in which the Virtual Machine 1 is located. Therefore, if incorrect determining or a failure occurs when whether the virtual machine is faulty is probed in the storage plane, the destination device further sends a probe packet to the source device in which the first virtual machine is located, to probe whether the first virtual machine runs normally in the source device. This improves reliability of probing whether the virtual machine in the source device is faulty, and effectively avoids occurrence of a virtual machine split brain.

Optionally, the identifier of the Virtual Machine 1 may be an IP address of the Virtual Machine 1, or may be a label of the Virtual Machine 1, or a type of mark information. In this embodiment of this application, an example in which the identifier of the Virtual Machine 1 is the IP address of the Virtual Machine 1 is used for description.

6. The probe module 341 in the destination device 340 sends the probe packet to the probe port 343. The probe packet is a broadcast packet, and the probe packet includes the identifier of the Virtual Machine 1 and the identifier of the service plane in which the Virtual Machine 1 is located.

Optionally, a destination MAC address of the probe packet is "ff:ff:ff:ff:ff:ff", indicating that the probe packet is the broadcast packet.

7. The probe packet is received through the probe port 333, of the service plane physnet 2, in the source device 330.

8. After the probe packet sent by the destination device 340 is received through the probe port 333, of the service plane physnet 2, in the source device 330, the probe packet is sent to the probe module 331, and the probe module 331 obtains the identifier of the Virtual Machine 1 carried in the probe packet, queries, using a libvirt interface, whether the corresponding Virtual Machine 1 runs normally, and feeds back a query result to the destination device 340. A transfer path of the feedback information is opposite to a transfer path of the probe packet. In an embodiment, the probe module 331 sends the feedback information to the probe port 333, the probe port 343 of the destination device 340 receives the feedback information, and sends the feedback information to the probe module 341, and the probe module 341 transfers the feedback information to the management module 344.

Optionally, a command for querying, using the libvirt interface, whether the corresponding Virtual Machine 1 runs normally may be (libvirt.open("qemu:///system").lookupByUUIDString(vm_uuid).isActive( )).

When receiving the command, the Virtual Machine 1 sends feedback information to the probe module 331 based on a running status of the Virtual Machine 1, where the feedback information may be true or false, where true indicates that the virtual machine Virtual Machine 1 runs normally, and false indicates that the virtual machine Virtual Machine 1 is faulty.

9. The management module 344 in the destination device 340 determines, based on whether the Virtual Machine 1 runs normally that is fed back by the source device 330, whether to configure the virtual machine Virtual Machine 1 in the destination device 340, and when the feedback information indicates that the Virtual Machine 1 runs in the source device 330, determines not to configure the Virtual Machine 1 in the destination device 340, or when the feedback information indicates that the Virtual Machine 1 does not run in the source device 330, determines to configure the Virtual Machine 1 in the destination device 340.

Therefore, in this embodiment of this application, if in an HA application scenario, a virtual machine creation procedure is triggered in a destination device, the destination device in which a first virtual machine needs to be recreated sends a probe packet to a source device in which the first virtual machine is located, where the probe packet is used to probe whether the first virtual machine runs in the source device. The destination device determines, based on the feedback information sent by the source device, whether to configure the first virtual machine in the destination device. This improves reliability of probing whether the virtual machine in the source device is faulty, and effectively avoids occurrence of a virtual machine split brain.

Figure 6:
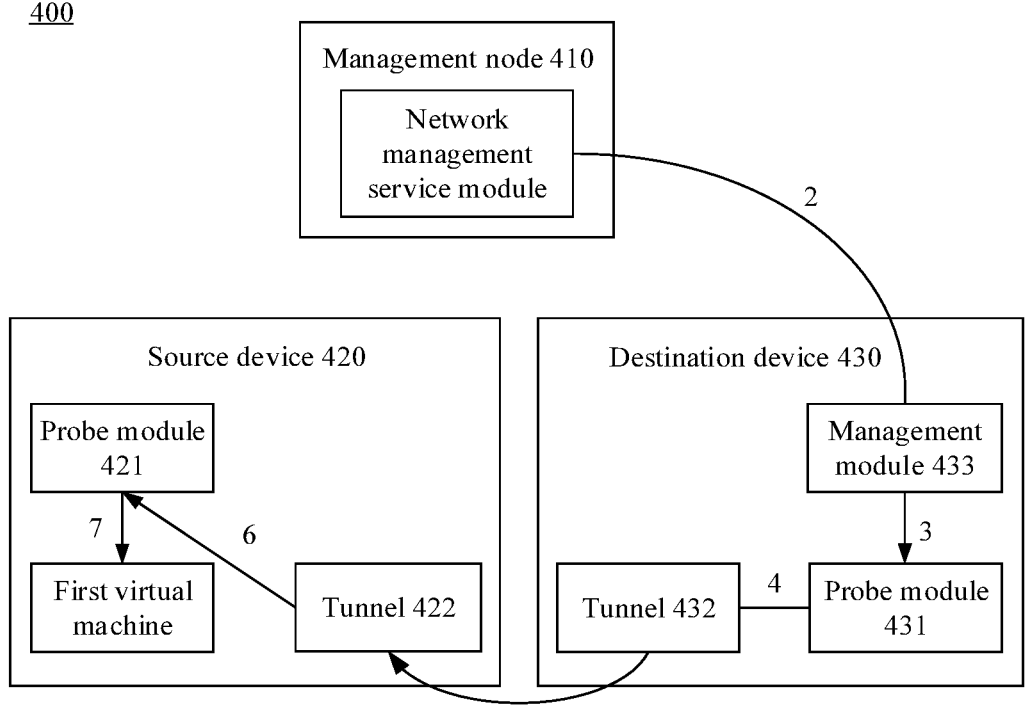
FIG. 6 is a schematic block diagram of an application scenario of a virtual machine status probe method according to this application.

FIG. 6 is schematic block diagram of an application scenario 400 of a virtual machine status probe method according to this application. The application scenario 400 is an overlay network. An existing overlay network mainly includes a VxLAN, network virtualization using generic routing encapsulation (NVGRE), and stateless transport tunneling (STT). The application scenario 400 includes a management node 410, a source device 420, and a destination device 430.

The management node 410 includes a network management service module, and the network management service module is mainly configured to create and manage a related network resource.

A first virtual machine (Virtual Machine 1) is configured in the source device 420, and the source device further includes a probe module 421 and a tunnel 422 (where the tunnel 422 may also be referred to as a data network plane interface). The probe module 421 may provide a capability of sending a user-defined broadcast probe packet, and receive a probe packet to probe whether a virtual machine is alive. The tunnel 422 is configured to send and receive a packet.

The destination device 430 includes a probe module 431, a tunnel 432, and a management module 433. For the probe module 431 and the tunnel 432, refer to corresponding descriptions of those in the source device 420. Details are not described herein again. The management module 433 is responsible for computing virtualization management, and is configured to create and manage a virtual machine deployed in the destination device.

It should be understood that the application scenario shown in FIG. 6 is merely for clearer understanding of this application, and should not constitute a special limitation on this embodiment of this application. For example, in addition to the source device 420 and the destination device 430, another host may further be managed by the management node, and the application scenario 400 may further include another management node. Other virtual machines may be further configured in the source device 420 and the destination device 430. Modular units configured in the source device 420 and the destination device 430 should be consistent. The source device 420 may alternatively be a destination device, and the destination device 430 may alternatively be a source device. For example, if a second virtual machine (Virtual Machine 2) is configured in the destination device 430, and if the Virtual Machine 2 needs to be configured in the source device 420 in an HA application scenario, the destination device 430 may be referred to as a source device, and the source device 420 may be referred to as a destination device.

For clearer understanding of this application, the following describes a specific procedure of this application in detail.

1. In a virtual machine application scenario, each host starts a probe module, and the probe module in each host monitors a tunnel, to identify a probe packet.

2. When the Virtual Machine 1 is determined to be configured in the destination device 430 in the HA application scenario, the management module 433 in the destination device 430 obtains, from the network management service module in the management node 410, an identifier of a tunnel in the source device 420 in which the Virtual Machine 1 is located.

Optionally, the management module 433 in the destination device 430 may obtain, based on an API provided by the management node 410, the identifier of the tunnel in the source device 420 in which the Virtual Machine 1 is located.

Optionally, the identifier of the tunnel may be an IP address of the tunnel, or may be a label of the tunnel, or may be a type of mark information. In this embodiment of this application, an example in which the identifier of the tunnel is the IP address of the tunnel is used for description.

Optionally, before the management module 433 in the destination device 430 obtains, from the network management service module in the management node 410, the identifier of the tunnel in the source device 420 in which the Virtual Machine 1 is located, the destination device 430 triggers storage plane probe for the Virtual Machine 1, but receives no feedback information from a storage server within a specified time. Further, the management module 433 obtains, from the network management service module in the management node 410, the identifier of the tunnel in the source device 420 in which the Virtual Machine 1 is located.

For a specific process in which the destination device 430 triggers storage plane probe for the Virtual Machine 1, refer to related descriptions in FIG. 4. To avoid repetition, details are not described herein again.

3. The management module 433 in the destination device 430 sends an invocation message to the probe module 431, where the invocation message is used to trigger the probe module 431 to send a probe packet, and the invocation message includes an identifier of the Virtual Machine 1 and the identifier of the tunnel in the source device 420 in which the Virtual Machine 1 is located.

Optionally, the invocation message may be an API, and the API triggers the probe module 431 to execute the probe script.

Optionally, the identifier of the Virtual Machine 1 may be an IP address of the Virtual Machine 1, or may be a label of the Virtual Machine 1, or a type of mark information. In this embodiment of this application, an example in which the identifier of the Virtual Machine 1 is the IP address of the Virtual Machine 1 is used for description.

4. The probe module 431 in the destination device 430 sends the probe packet, where the probe packet is a unicast probe packet, a destination address of the probe packet is an IP address of the source device 420, and the probe packet further includes the identifier of the virtual machine.

5. The probe packet is received through the tunnel 422 in the source device 420.

6. The probe packet is sent to the probe module 421 through the tunnel 422 in the source device 420.

7. The probe module 421 obtains the identifier of the Virtual Machine 1 carried in the probe packet, queries, using a libvirt interface, whether the corresponding Virtual Machine 1 runs normally, and feeds back a query result to the destination device 430. A transfer path of the feedback information is opposite to a transfer path of the probe packet. In an embodiment, the probe module 421 sends the feedback information to the tunnel 422, the tunnel 432 of the destination device 430 receives the feedback information, and sends the feedback information to the probe module 431, and the probe module 431 transfers the feedback information to the management module 433.

Optionally, a command for querying, using the libvirt interface, whether the corresponding Virtual Machine 1 runs normally may be (libvirt.open("qemu:///system").lookupByUUIDString(vm_uuid).isActive( )).

When receiving the command, the Virtual Machine 1 sends feedback information to the probe module 421 based on a running status of the Virtual Machine 1, where the feedback information may be true or false, where true indicates that the virtual machine Virtual Machine 1 runs normally, and false indicates that the virtual machine Virtual Machine 1 is faulty.

8. The management module 433 in the destination device 430 determines, based on whether the Virtual Machine 1 runs normally that is fed back by the source device 420, whether to configure the virtual machine Virtual Machine 1 in the destination device 430, and when the feedback information indicates that the Virtual Machine 1 runs in the source device 420, determines not to configure the Virtual Machine 1 in the destination device 430, or when the feedback information indicates that the Virtual Machine 1 does not run in the source device 420, determines to configure the Virtual Machine 1 in the destination device 430.

Therefore, in this embodiment of this application, if in an HA application scenario, a virtual machine creation procedure is triggered in a destination device, the destination device in which a first virtual machine needs to be recreated sends a probe packet to a source device in which the first virtual machine is located, where the probe packet is used to probe whether the first virtual machine runs in the source device. The destination device determines, based on the feedback information sent by the source device, whether to configure the first virtual machine in the destination device. This improves reliability of probing whether the virtual machine in the source device is faulty, and effectively avoids occurrence of a virtual machine split brain.

Figure 7:
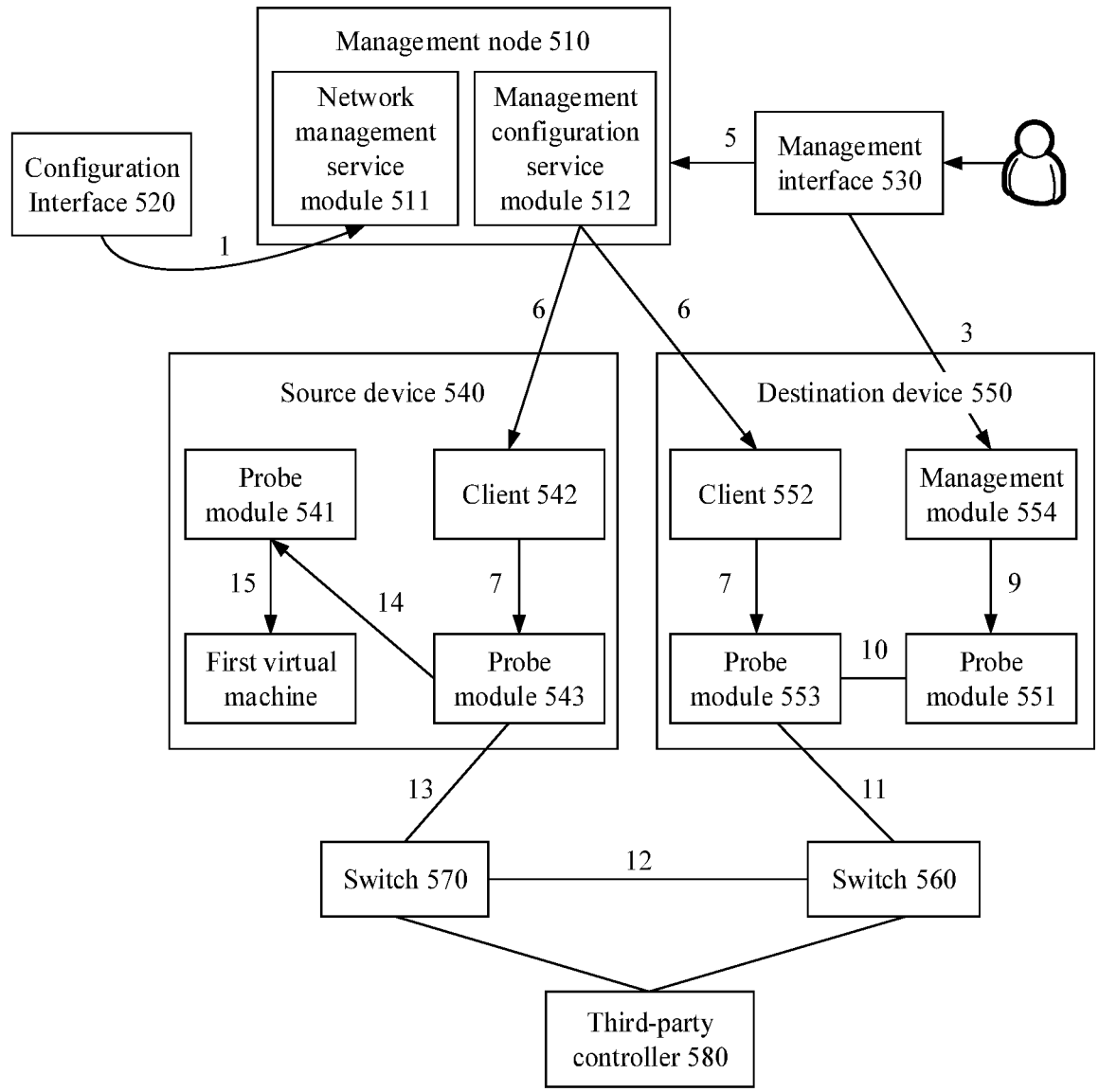
FIG. 7 is a schematic block diagram of an application scenario of a virtual machine status probe method according to this application.

FIG. 7 is schematic block diagram of an application scenario 500 of a virtual machine status probe method and a device according to this application. The application scenario 500 is a VxLAN in virtual interconnection with a third-party SDN. The application scenario 500 includes a management node 510, a configuration interface 520, a management interface 530, a source device 540, a destination device 550, a switch 560, a switch 570, and a third-party controller 580. In this application scenario, a VxLAN network is mapped as a VLAN network. It should be understood that the VxLAN network is only a form of an overlay network. In this application, another overlay may alternatively be mapped as the VLAN network. For a specific implementation of mapping the other overlay as the VLAN network, refer to a process of mapping the VxLAN network as the VLAN network. Details are not described herein again.

The management node 510 includes a network management service module 511 and a management configuration service module 512. The network management service module 511 is mainly configured to create and manage a related network resource. The management configuration service module 512 is mainly configured to receive configuration information delivered by an administrator using the management interface 530, and trigger, based on the configuration information, a client in a corresponding host to implement configuration or modify a corresponding configuration. When a virtual machine is created, when an administrator specifies a service network of the virtual machine as a VxLAN network, the network management service module 511 maps the VxLAN network as a VLAN network through hierarchical binding such that a packet of the virtual machine can be forwarded in a manner in the VLAN network, and when the packet is sent to a switch, the packet is forwarded in a manner of forwarding the packet in the VxLAN network.

For the configuration interface 520, the administrator may perform, using the configuration interface 520, interconnection configuration between a third-party SDN controller and the VxLAN. The administrator sends, using the configuration interface 520 to the network management service module 511 in the management node 510, an identifier of a service plane mapped from the VxLAN network. The network management service module 511 stores a mapping relationship of the service plane mapped from the VxLAN network.

The management interface 530 is an interface-based installation and deployment tool. The administrator sends, using the management interface to the destination device 550, the identifier of the service plane mapped from the VxLAN network. The management module 554 in the destination device 550 records the mapping relationship of the service plane mapped from the VxLAN network. The administrator uses the management interface 530 to configure a physical plane of a virtual machine and a probe identifier (where the probe identifier may also be referred to as a probe VLAN) of the physical plane.

A first virtual machine (Virtual Machine 1) is configured in the source device 540, and the source device further includes a probe module 541, a client 542, and a probe port 543. The probe module 541 may provide a capability of sending a user-defined broadcast probe packet, and receive a probe packet to probe whether a virtual machine is alive. The client 542 is configured to receive the configuration information sent by the management node 510, and perform a related operation to complete a configuration change. The probe port 543 is a probe port of a corresponding physical plane, and the probe module 541 sends and receives a packet through the probe port 543.

The destination device 550 includes a probe module 551, a client 552, a probe port 553, and a management module 554. For the probe module 551, the client 552, and the probe port 553, refer to corresponding descriptions of those in the source device 540. Details are not described herein again. The management module 544 is responsible for computing virtualization management, and is configured to create and manage a virtual machine deployed in the destination device.

The switch 560 and the switch 570 are configured to transmit a packet.

The third-party controller 580 may implement configuration of the switch 560 and the switch 570.

It should be understood that the application scenario shown in FIG. 7 is merely for clearer understanding of this application, and should not constitute a special limitation on this embodiment of this application. For example, in addition to the source device 540 and the destination device 550, another host may further be managed by the management node, and the application scenario 500 may further include another management node. Other virtual machines may be further configured in the source device 540 and the destination device 550. Modular units configured in the source device 540 and the destination device 550 should be consistent. The source device 540 may alternatively be a destination device, and the destination device 550 may alternatively be a source device.

For clearer understanding of this application, the following describes a specific procedure of this application in detail.

1. The administrator may perform, using the configuration interface 520, interconnection configuration between a third-party SDN controller and a VxLAN. The administrator sends, using the configuration interface 520 to the network management service module 511 in the management node 510, an identifier of a service plane mapped from the VxLAN network (where herein, it is assumed that the service plane is a physnet 2). The network management service module 511 stores a mapping relationship of the service plane mapped from the VxLAN network.

2. The network management service module 511 in the management node 510 maps the VxLAN network as a VLAN network through hierarchical binding.

3. The administrator sends, using the management interface 530 to the destination device 550, the identifier of the service plane mapped from the VxLAN network. The management module 554 in the destination device 550 records a mapping relationship of the service plane mapped from the VxLAN network.

4. The administrator configures a Layer 2 bridge (L2BR) (where the L2BR is configured to implement Layer 2 interoperation between servers of the VxLAN and the VLAN) in the SDN controller to connect a probe identifier to a virtual network identifier (VNI). The L2BR encapsulates the packet into a VxLAN packet based on VLAN-VNI mapping predefined by the controller, searches a VxLAN flow table of the destination device, and forwards the packet to a destination virtual tunnel end point (VTEP).

5. The administrator configures a probe identifier of the service plane physnet 2 using the management interface 530, and sends the probe identifier of the service plane physnet 2 to the management node 510.

6. The management configuration service module 512 in the management node 510 receives the probe identifier of the service plane physnet 2 and sends the probe identifier of the service plane physnet 2 to each host managed by the management node, for example, the source device 540 and the destination device 550 shown in FIG. 5.

7. A client of each host creates a probe port corresponding to the probe identifier in the service plane physnet 2 and the probe port may use the probe identifier as a mark. The probe port 543 of the source device shown in FIG. 6 is a probe port of the service plane physnet 2, a mark of the probe port 543 is the probe identifier of the service plane physnet 2, the probe port 553 of the destination device is a probe port of the service plane physnet 2, and a mark of the probe port 553 is the probe identifier of the service plane physnet 2.

Optionally, each host may alternatively create, in the service plane physnet 2 using a custom script or in another manner, a probe port corresponding to the probe identifier. A specific method for creating a probe port in the service plane by the host is not limited in this application.

8. A probe module on a virtual machine in a cluster monitors the probe port of the service plane physnet 2. This step is not shown in FIG. 6.

9. When it is determined to configure the Virtual Machine 1 in the destination device 550 in an HA application scenario, the management module 554 in the destination device 550 sends an invocation message to the probe module 551, where the invocation message is used to trigger the probe module 551 to execute a probe script, and the invocation message includes an identifier of the Virtual Machine 1 and an identifier of a service plane in which the Virtual Machine 1 is located.

Optionally, the invocation message may be an API, and the API triggers the probe module 551 to execute the probe script.

The identifier of the service plane in which the Virtual Machine 1 is located is determined by obtaining, by the management module 454, a network used by the Virtual Machine to perform communication and based on a mapping relationship between the network and a physical plane.

Optionally, before the management module 554 in the destination device 550 sends the invocation message to the probe module 551, the destination device 550 triggers storage plane probe for the Virtual Machine 1, but receives no feedback information from a storage server within a specified time. Further, the management module 554 sends the invocation message to the probe module 551, and probes the virtual machine in the service plane.

For a specific procedure in which the destination device 550 triggers storage plane probe for the Virtual Machine 1, refer to related descriptions in FIG. 4. Details are not described herein again.

10. The probe module 551 in the destination device 550 sends the probe packet to the probe port 553. The probe packet is a broadcast packet, and the probe packet includes the identifier of the Virtual Machine 1 and the identifier of the service plane in which the Virtual Machine 1 is located.

11. The broadcast packet sent by the probe port 553 is transferred to the switch 560, and the switch 560 identifies the probe packet based on a VLAN probe identifier carried in the probe packet, encapsulates the probe packet from an original VLAN network packet format into a VxLAN network packet format, and sends the encapsulated packet to the switch 570.

Figure 8:
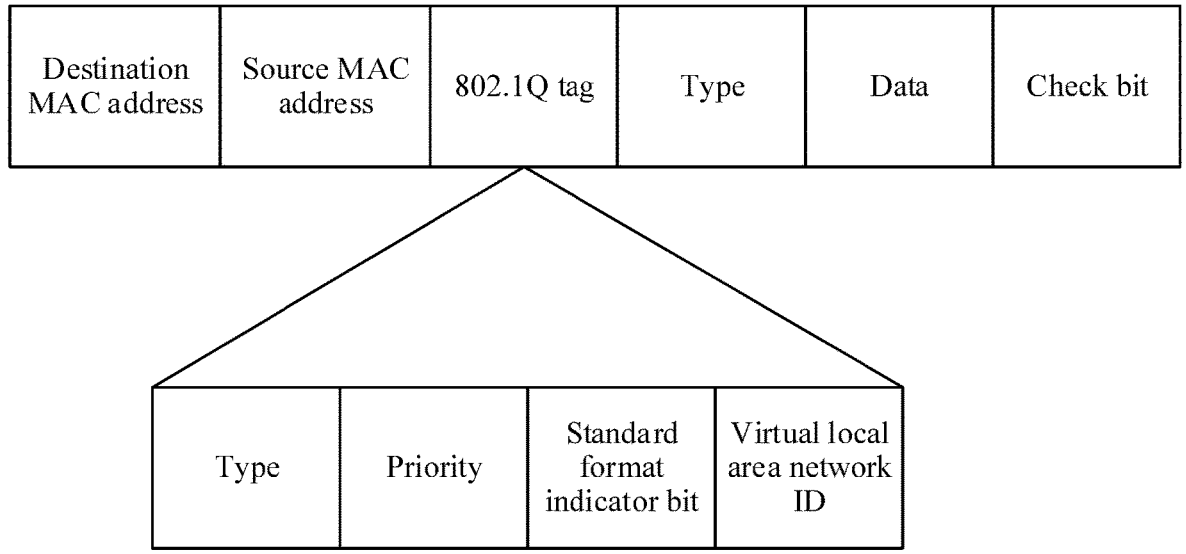
FIG. 8 shows a format of a VLAN packet according to this application.

Specifically, the packet format of the VLAN probe packet is shown in FIG. 8. The packet format is defined in an 802.1Q standard, and the VLAN packet includes a destination MAC address, a source MAC address, an 802.1Q tag, a type, data, and a check bit FCS. An 802.1Q field is added to an Ethernet frame format defined in the 802.1Q standard based on a traditional Ethernet frame format. The field includes four parts Type, priority (PRI), canonical format indicator (CFI), and VID. Meanings of the four parts are as follows Type has a length of two bytes, and indicates a frame type. A Type field in an 802.1Q tag frame has a fixed value of 0×8100. If a device that does not support 802.1Q receives an 802.1Q frame, the device discards the frame.

A PRI field has a length of three bits, indicates a priority of the Ethernet frame, and has a value ranging from 0 to 7. A larger value indicates a higher priority. When transmission congestion occurs in a switch or router, the switch or router preferentially sends a high-priority data frame.

A CFI has a length of one bit, and indicates whether a MAC address is in a classic format. A CFI having a value of 0 indicates that a MAC address is in a classic format. A CFI having a value of 1 indicates that a MAC address is not in a classic format. This field is used to distinguish between an Ethernet frame, a fiber distributed data interface (FDDI) frame, and a token ring network frame. In the Ethernet frame, a CFI has a value of 0.

A VID has a length of 12 bits, and has a value ranging from 0 to 4095. 0 and 4095 are reserved values and cannot be used. This field uniquely identifies a VLAN. The VID having a length of 12 bits can represent 4096 different values. One Ethernet can be divided into a maximum of 4094 VLANs other than VLANs of the two reserved values.

Figure 9:
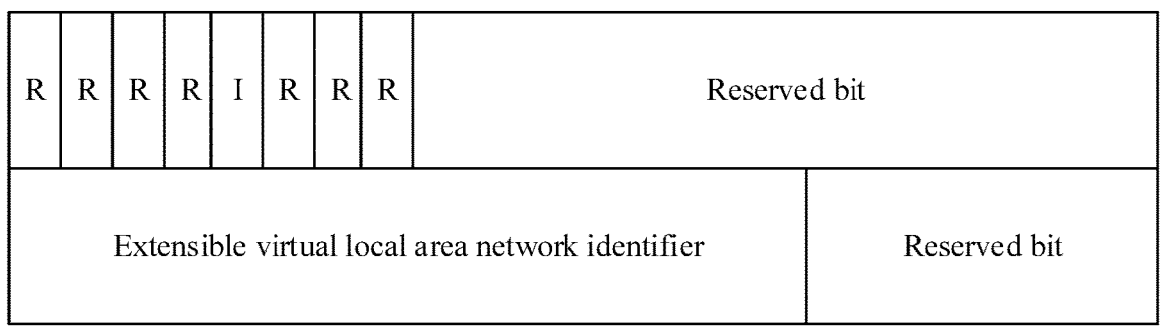
FIG. 9 shows a format of a virtual extensible local area network (VxLAN) packet according to this application.

The VxLAN encapsulates, in a physical network, a data frame for communication in a logical network for transmission, and a process of encapsulation and decapsulation is completed by the switch 560. After adding a VxLAN header to the data frame in the logical network, the VxLAN encapsulates the data frame into a user datagram protocol (UDP) packet in the physical network for transmission. A format of the VxLAN header is shown in FIG. 9. The VxLAN header includes eight bytes, and the first byte is a flag bit. If a flag bit I is set to 1, it indicates that the VXLAN header is valid. Other flags are reserved and should be set to 0 during transmission. The second byte to the fourth byte are reserved. The fifth byte to the seventh byte are VXLAN identifiers, used to indicate a unique logical network. The eighth byte is also a reserved field and is not used temporarily.

After adding the VxLAN header to the data frame of the logical link network, the switch 560 sequentially adds a UDP header, an IP header, and an Ethernet frame header, and then sends the data frame to the switch 570.

It should be understood that if there are a plurality of hosts managed by the management node, and each host corresponds to a corresponding switch, the encapsulated packet is sent to the plurality of switches.

12. The switch 560 sends the encapsulated packet to the switch 570.

13. The switch 570 sends the probe packet to the source device 540.

14. The probe port 543, of the service plane physnet 2, in the source device 540, receives the probe packet.

15. After receiving the probe packet sent by the destination device 550, the probe port 543, of the service plane physnet 2, in the source device 540, sends the probe packet to the probe module 541, and the probe module 541 obtains the identifier of the Virtual Machine 1 carried in the probe packet, queries, using a libvirt interface, whether the corresponding Virtual Machine 1 runs normally, and feeds back a query result to the destination device 550. A transfer path of the feedback information is opposite to a transfer path of the probe packet. In an embodiment, the probe module 541 sends the feedback information to the probe port 543, then the switch 570, the switch 560, and the probe port 553 that is of the destination device 550 sequentially receive the feedback information, and the probe port 553 sends the feedback information to the probe module 551, and the probe module 551 transfers the feedback information to the management module 554.

Optionally, a command for querying, using the libvirt interface, whether the corresponding Virtual Machine 1 runs normally may be (libvirt.open("qemu:///system").lookupByUUIDString(vm_uuid).isActive( )).

When receiving the command, the Virtual Machine 1 sends feedback information to the probe module 541 based on a running status of the Virtual Machine 1, where the feedback information may be true or false, where true indicates that the virtual machine Virtual Machine 1 runs normally, and false indicates that the virtual machine Virtual Machine 1 is faulty.

16. The management module 554 in the destination device 550 determines, based on whether the Virtual Machine 1 runs normally that is fed back by the source device 540, whether to configure the virtual machine Virtual Machine 1 in the destination device 550.

Therefore, in this embodiment of this application, if in an HA application scenario, a virtual machine creation procedure is triggered in a destination device, the destination device in which a first virtual machine needs to be recreated sends a probe packet to a source device in which the first virtual machine is located, where the probe packet is used to probe whether the first virtual machine runs in the source device. The destination device determines, based on the feedback information sent by the source device, whether to configure the first virtual machine in the destination device. This improves reliability of probing whether the virtual machine in the source device is faulty, and effectively avoids occurrence of a virtual machine split brain.

This application further provides a system. The system includes a destination device and a source device, and includes the following.

The destination device obtains invocation message when a HA procedure of a first virtual machine is triggered, where the invocation message is used to probe the first virtual machine. The destination device obtains an identifier of the first virtual machine. The destination device invokes a probe script based on the invocation message, and transfers the identifier of the first virtual machine to the probe script. The destination device sends a probe packet by running the probe script, where the probe packet is used to probe a status of the first virtual machine in the source device, and the probe packet includes the identifier of the first virtual machine. The source device receives the probe packet sent by the destination device. The source device queries for the status of the first virtual machine based on the probe packet. The source device sends feedback information to the destination device, where the feedback information is used to indicate the status of the first virtual machine in the source device. The destination device receives the feedback information sent by the source device. The destination device determines, based on the feedback information, whether to recreate the first virtual machine in the destination device.

Optionally, when a probe port of the source device and a probe port of the destination device are located in a same VLAN, the probe packet is a broadcast packet, and the probe packet includes a probe VLAN identifier of a first service plane in which the first virtual machine is located.

Optionally, the system further includes a management device. The management device receives the probe VLAN identifier of the first service plane, and sends the probe VLAN identifier to the source device and the destination device.

Optionally, the destination device receives the probe VLAN identifier.

The destination device configures the probe port in the first service plane, and configures the probe VLAN identifier for the probe port. That the destination device sends a probe packet by running the probe script includes the destination device sends the probe packet through the probe port.

Optionally, the source device receives the probe VLAN identifier sent by the management device. The source device configures the probe port in the first service plane, and configures the probe VLAN identifier for the probe port. That the source device receives the probe packet sent by the destination device includes the source device receives, through the probe port, the probe packet sent by the destination device.

Optionally, the system further includes a switch. The controller sends the probe VLAN identifier of the first service plane in which the first virtual machine is located to the switch. The switch receives the probe VLAN identifier that is of the first service plane in which the first virtual machine is located and that is sent by the controller, associates the VLAN identifier with an overlay network identifier, and converts, based on the associated VLAN identifier and overlay network identifier, a packet that is received by the switch and that includes the VLAN identifier into a packet in an overlay form for sending.

Optionally, when the source device communicates with the destination device through an overlay network, the probe packet is a unicast packet, and the probe packet includes an identifier of a tunnel port of the source device.

Optionally, the system further includes a management device. The destination device obtains, from the management device based on the identifier of the first virtual machine, the identifier of the tunnel port corresponding to the source device. That the destination device sends a probe packet by running the probe script includes the destination device sends the probe packet through a tunnel port of the destination device.

Optionally, that the source device receives the probe packet sent by the destination device includes the source device receives the probe packet through the tunnel port of the source device.

Optionally, before that the destination device sends an invocation message, the method further includes the destination device sends a first message to a server, where the first message is used to request disk storage information of the first virtual machine in the server, and is used to determine a status of the first virtual machine by probing a storage plane of the first virtual machine, and the destination device receives no feedback information from the server within a predetermined time period.

Optionally, that the destination device determines, based on the feedback information, whether to recreate the first virtual machine in the destination device includes when the feedback information indicates that the status of the first virtual machine in the source device is normal, the destination device determines not to recreate the first virtual machine in the destination device, or when the feedback information indicates that the status of the first virtual machine in the source device is faulty, the destination device determines to recreate the first virtual machine in the destination device.

It should be understood that, for understanding of the source device and the destination device in the system, refer to the descriptions in the foregoing embodiments. To avoid repetition, details are not described herein again.

Figure 10:
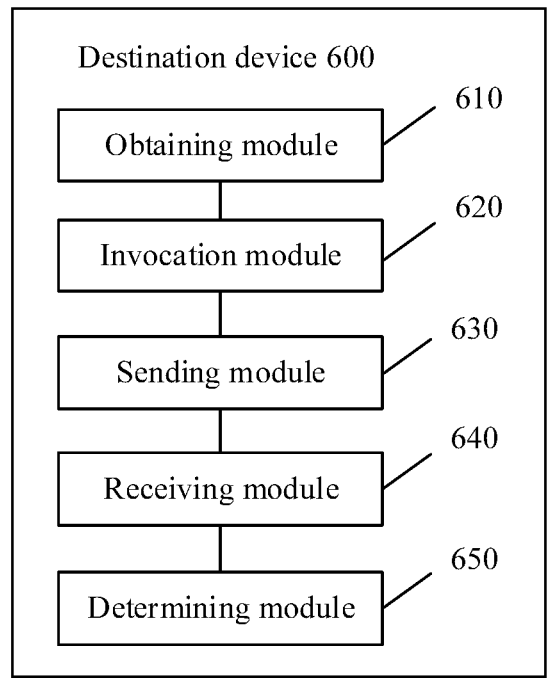
FIG. 10 is a schematic block diagram of a destination device according to this application.

FIG. 10 is a schematic block diagram of a destination device 600 according to this application. As shown in FIG. 10, the destination device includes the following modules an obtaining module 610 configured to obtain an invocation message, where the invocation message is used to probe the first virtual machine, where the obtaining module 610 is further configured to obtain an identifier of the first virtual machine, an invocation module configured to invoke a probe script based on the invocation message, and transfer the identifier of the first virtual machine to the probe script, a sending module 630 configured to send a probe packet by running the probe script, where the probe packet is used to probe a status of the first virtual machine in the source device, and the probe packet includes the identifier of the first virtual machine, a receiving module 640 configured to receive feedback information sent by the source device, where the feedback information is used to indicate the status of the first virtual machine, and a determining module 650 configured to determine, based on the feedback information, whether to recreate the first virtual machine in the destination device.

Optionally, the obtaining module 610, the invocation module 620, the sending module 630, the receiving module 640, and the determining module 650 are configured to perform the operations of the virtual machine fault probe method 200 in this application. For brevity, details are not described herein again.

Figure 11:
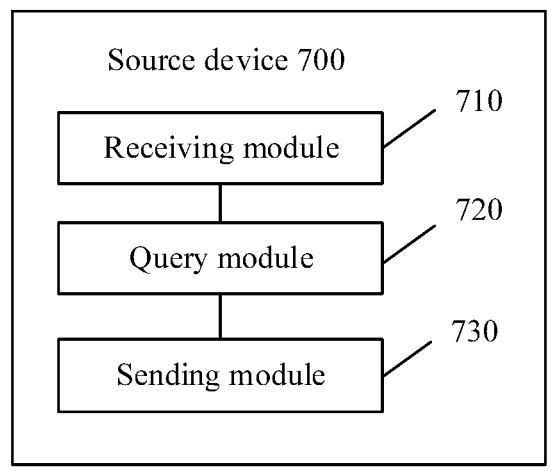
FIG. 11 is a schematic block diagram of a source device according to this application.

FIG. 11 is a schematic block diagram of a source device 700 according to this application. As shown in FIG. 11, the source device includes the following modules a receiving module 710 configured to receive a probe packet sent by a destination device, where the probe packet is used to probe a status of the first virtual machine in the source device, and the probe packet includes an identifier of the first virtual machine, a query module 720 configured to query for the status of the first virtual machine based on the probe packet, and a sending module 730 configured to send feedback information to the destination device, where the feedback information is used to indicate the status of the first virtual machine in the source device.

Optionally, the receiving module 710, the query module 720, and the sending module 730 are configured to perform the operations of the virtual machine fault probe method 200 in this application. For brevity, details are not described herein again.

The foregoing destination device and source device completely correspond to the destination device and the source device in the method embodiments. Corresponding modules perform corresponding steps. For details, refer to the corresponding method embodiments.

Figure 12:
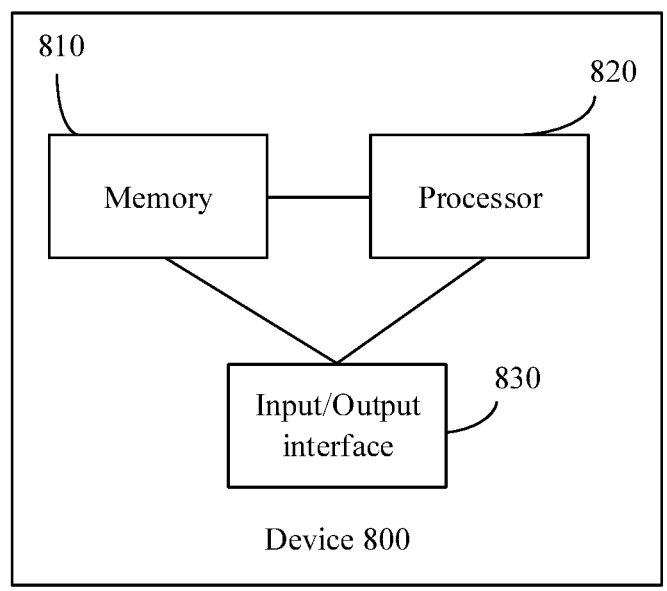
FIG. 12 is a schematic block diagram of a device according to this application.

FIG. 12 is a schematic block diagram of a device 800 according to this application. The device 800 includes a memory 810, a processor 820, and an input/output interface 830. The memory 810, the processor 820, and the input/output interface 830 are connected using an internal connection path. The memory 810 is configured to store a program instruction. The processor 820 is configured to execute the program instruction stored in the memory 810, to control the input/output interface 830 to receive input data and information, and output data such as an operation result.

Optionally, when the program instruction is executed, the processor 820 may implement the operations of the method 200. For brevity, details are not described herein again. The input/output interface 830 is configured to perform, under driving of the processor 820, specific signal receiving and sending.

The device 800 may be the foregoing source device or destination device, and performs operations of the determining module, the query module, and the invocation module. The input/output interface 830 performs corresponding steps of the sending module and the receiving module.

It should be understood that, in this embodiment of this application, the processor 820 may be a CPU, or the processor 820 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like.

A person of ordinary skill in the art may be aware that, in combination with units and algorithm steps of the examples described in the embodiments disclosed in this specification, this application may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

When the functions are implemented in the form of a software function unit and sold or used as an independent product, the functions may be stored in a computer-readable storage medium. Based on such an understanding, the technical solutions of this application essentially, or the part contributing to other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a Universal Serial Bus (USB) flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A virtual machine status probe method implemented by a destination device, comprising:
obtaining an invocation message and a probe virtual local area network (VLAN) identifier of a first service plane in which a first virtual machine is located;
invoking a probe script based on the invocation message;
transferring the first identifier to the probe script;

sending a probe packet by running the probe script, wherein the probe packet probes a status of the first virtual machine in a source device, wherein the probe packet is a broadcast packet when a first probe port of the source device and a second probe port of the destination device are located in a same VLAN, and wherein the probe packet comprises the probe VLAN identifier;

receiving feedback information from the source device in response to the probe packet, wherein the feedback information indicates the status; and determining, based on the feedback information, whether to recreate the first virtual machine in the destination device.

2. The virtual machine status probe method of claim 1, further comprising:

receiving the probe VLAN identifier from a management device;

configuring the second probe port in the first service plane;

configuring the probe VLAN identifier for the second probe port; and sending the probe packet through the second probe port.

3. The virtual machine status probe method of claim 1, wherein the probe packet is a unicast packet when the source device communicates with the destination device through an overlay network, and wherein the probe packet comprises a second identifier of a first tunnel port of the source device.

4. The virtual machine status probe method of claim 3, further comprising:

obtaining, from a management device based on the first identifier, the second identifier; and sending the probe packet through a second tunnel port of the destination device.

5. The virtual machine status probe method of claim 1, wherein before obtaining the invocation message, the virtual machine status probe method further comprises sending a first message to a server, and wherein the first message requests disk storage information of the first virtual machine in the server and determines the status of the first virtual machine based on a storage plane of the first virtual machine.

6. The virtual machine status probe method of claim 1, further comprising:

determining not to recreate the first virtual machine in the destination device when the feedback information indicates that the status of the first virtual machine in the source device is normal; or determining to recreate the first virtual machine in the destination device when the feedback information indicates that the status of the first virtual machine in the source device is faulty.

7. The virtual machine status probe method of claim 1, wherein the broadcast packet comprises includes a destination media access control (MAC) address and a source MAC address.

8. A destination device, comprising:

a processor; and a memory coupled to the processor and configured to store instructions that, when executed by the processor, cause the destination device to be configured to:

obtain an invocation message and a first identifier of a probe virtual local area network (VLAN) first service plane in which a virtual machine is located;

invoke a probe script based on the invocation message;

transfer the first identifier to the probe script;

send a probe packet by running the probe script, wherein the probe packet probes a status of the first virtual machine in a source device, and wherein the probe packet is a broadcast packet when a first probe port of the source device and a second probe port of the destination device are located in a same VLAN, and wherein the probe packet comprises the probe VLAN identifier;

receive feedback information from the source device in response to the probe packet, wherein the feedback information indicates the status of the first virtual machine; and determine, based on the feedback information, whether to recreate the first virtual machine in the destination device.

9. The destination device of claim 8, wherein the instructions further cause the destination device to be configured to:

receive the probe VLAN identifier from a management device;

configure the second probe port in the first service plane;

configure the probe VLAN identifier for the second probe port; and send the probe packet through the second probe port.

10. The destination device of claim 8, wherein the probe packet is a unicast packet when the source device communicates with the destination device through an overlay network, and wherein the probe packet comprises a second identifier of a first tunnel port of the source device.

11. The destination device of claim 10, wherein the instructions further cause the destination device to be configured to:

obtain, from a management device based on the first identifier, the second identifier; and send the probe packet through a second tunnel port of the destination device.

12. The destination device of claim 8, wherein the instructions further cause the destination device to be configured to send a first message to a server, and wherein the first message requests disk storage information of the first virtual machine in the server and determines the status of the first virtual machine based on a storage plane of the first virtual machine.

13. The destination device of claim 8, wherein the instructions further cause the destination device to be configured to:

determine not to recreate the first virtual machine in the destination device when the feedback information indicates that the status of the first virtual machine in the source device is normal; or determine to recreate the first virtual machine in the destination device when the feedback information indicates that the status of the first virtual machine in the source device is faulty.

14. The destination device of claim 8, wherein the broadcast packet comprises includes a destination media access control (MAC) address and a source MAC address.

15. A computer program product comprising computer-executable instructions stored on a non-transitory computer-readable medium that, when executed by a processor, cause a destination device to:

obtain an invocation message and a probe virtual local area network (VLAN) identifier of a first service plane in which a first virtual machine is located;

invoke a probe script based on the invocation message;

transfer the first identifier to the probe script;

send a probe packet by running the probe script, wherein the probe packet probes a status of the first virtual machine in a source device, wherein the probe packet is a broadcast packet when a first probe port of the source device and a second probe port of the destination device are located in a same VLAN, and wherein the probe packet comprises the probe VLAN identifier;

receive feedback information from the source device in response to the probe packet, wherein the feedback information indicates the status of the first virtual machine; and determine, based on the feedback information, whether to recreate the first virtual machine in the destination device.

16. The computer program product of claim 15, wherein the instructions further cause the destination device to:

receive the probe VLAN identifier from a management device;

configure the second probe port in the first service plane;

configure the probe VLAN identifier for the second probe port; and send the probe packet through the second probe port.

17. The computer program product of claim 15, wherein the probe packet is a unicast packet when the source device communicates with the destination device through an overlay network, and wherein the probe packet comprises a second identifier of a first tunnel port of the source device.

18. The computer program product of claim 17, wherein the instructions further cause the destination device to:

obtain, from a management device based on the first identifier, the second identifier; and send the probe packet through a second tunnel port of the destination device.

19. The computer program product of claim 15, wherein the instructions further cause the destination device to send a first message to a server, and wherein the first message requests disk storage information of the first virtual machine in the server and determines the status of the first virtual machine based on a storage plane of the first virtual machine.

20. The computer program product of claim 15, wherein the broadcast packet comprises includes a destination media access control (MAC) address and a source MAC address.

* * * * *